United States Patent
Hasegawa

(10) Patent No.: US 7,164,491 B2
(45) Date of Patent: Jan. 16, 2007

(54) IDENTIFYING APPARATUS, APPARATUS TO BE IDENTIFIED, IDENTIFYING METHOD, AND PRINTING APPARATUS

(75) Inventor: Satoshi Hasegawa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 922 days.

(21) Appl. No.: 09/981,207

(22) Filed: Oct. 17, 2001

(65) Prior Publication Data

US 2003/0151771 A1  Aug. 14, 2003

(51) Int. Cl.
G06F 15/00 (2006.01)

(52) U.S. Cl. ............. 358/1.18; 358/1.9; 358/1.15; 358/504; 399/24; 399/25; 399/26; 399/27; 399/28; 399/29; 399/30; 399/49; 399/61; 399/12; 399/13; 347/6; 347/7; 347/84; 347/86; 347/107

(58) Field of Classification Search ............. 358/1.9, 358/1.15, 504; 399/24, 25, 26, 37, 28, 29, 399/30, 49; 347/6, 7
See application file for complete search history.

(56) References Cited

U.S. PATENT DOCUMENTS

| | | | |
|---|---|---|---|
| 4,961,088 A | 10/1990 | Gilliland et al. | |
| 5,272,503 A | 12/1993 | LeSueur et al. | |
| 5,949,349 A * | 9/1999 | Farris et al. | 340/5.26 |
| 6,597,875 B1 * | 7/2003 | Hasegawa | 399/12 |
| 6,636,702 B1 * | 10/2003 | Abe | 399/12 |
| 6,672,695 B1 * | 1/2004 | Naka et al. | 347/7 |
| 6,748,182 B1 * | 6/2004 | Yoshida et al. | 399/12 |
| 6,810,438 B1 * | 10/2004 | Chrysanthakopoulos | 710/16 |
| 6,862,724 B1 * | 3/2005 | Riley et al. | 716/17 |
| 6,986,057 B1 * | 1/2006 | Cusey et al. | 713/161 |

* cited by examiner

Primary Examiner—Twyler Lamb
Assistant Examiner—Robert N. Kang
(74) Attorney, Agent, or Firm—Frishauf, Holtz, Goodman & Chick, P.C.

(57) ABSTRACT

An encoder of a process unit encodes an identification code output by the CPU of a main unit, thereby obtaining a response code. The response code is returned to the main unit. The logic of the encoder is changeable. At shipment, a first logic is set in the encoder. After use, a second logic determined on the basis of a predetermined rule is set to the encoder under control of the CPU. The main unit stores the second logic set in the encoder of the process unit. The identification code is encoded by the encoder of the main unit individually with the first logic and the stored second logic, with the result that normal codes are obtained. The normal codes are collated with the response code by a collator. The CPU identifies the status of the process unit based on the result of the collation by the collator.

4 Claims, 3 Drawing Sheets

| Second logic | Drum count value |
|---|---|
| 08201432 | 19062 |
| 10311016 | 19311 |

FIG. 3A

| Second logic | Drum count value |
|---|---|
| 08201432 | 19062 |
| 10311016 | 19311 |
| 12081158 | 0 |

FIG. 3B

IDENTIFYING APPARATUS, APPARATUS TO BE IDENTIFIED, IDENTIFYING METHOD, AND PRINTING APPARATUS

BACKGROUND OF THE INVENTION

1. Field of the Invention

The present invention relates to an identifying apparatus, an apparatus to be identified, an identifying method and a printing apparatus, suitable for the use of monitoring consumables of a product including a consumable that can be exchanged, for example, a copying machine, a printer or a facsimile apparatus.

2. Description of the Related Art

In general, consumables, such as toner, are used in a copying machine and a printer. For ease of maintenance by the user, consumables are unitized to allow easy exchange.

Such a consumable unit usually deteriorates through usage. Therefore, when the amount of the consumable in the unit reaches a certain level, the consumable unit cannot offer initial performance. To prevent this, conventionally, the apparatus main body monitors the amount of the consumable in the unit; and when the consumable unit approaches the end of its lifetime, a measure of prohibiting the use of the unit is taken.

However, the amount of the consumable in the unit is generally monitored as the number of sheets printed from the time when the consumable unit is attached. Therefore, even if a used consumable unit is attached, the consumption will be monitored as an unused unit. Thus, there is a problem that a used consumable unit or a consumable unit fabricated by using a used unit as a base can be used as a new unit.

There is a consumable unit with a memory, so that the consumption of the consumable unit is stored in the memory. However, in this case, there is a problem that it can easily be counterfeited as a new unit by rewriting the memory.

Further, there is a system in which, when a consumable unit is attached to the apparatus main body, a part of the consumable unit is mechanically or electrically broken, so that new and used units can be distinguished. However, with this structure, it is difficult to recycle the unit in the regular route.

BRIEF SUMMARY OF THE INVENTION

An object of the present invention is to easily and reliably identify whether a unit, for example, a consumable unit, is new or not without deception, and easily recycle the consumable unit.

According to an aspect of the present invention, there is provided an identifying apparatus as described below.

An identifying apparatus for identifying a status of an apparatus to be identified, independent of and detachably attached to the identifying apparatus, the apparatus to be identified outputting a response code obtained by encoding a predetermined identification code with a set logic and a predetermined first logic being set in the apparatus to be identified as the logic in an initial status, the identifying apparatus comprising: an input port through which a signal output from the apparatus to be identified is input; an output port through which a signal is output to the apparatus to be identified; a storage section to store a second logic different from the first logic; an identification code generating section which outputs the identification code through the output port; an encoding section which converts the identification code generated by the identification code generating section individually with the first logic and the second logic stored in the storage section to normal codes; a collating section which individually collates the normal codes obtained by the encoding section with the response code input through the input port; a change section which determines a logic determined in accordance with a predetermined rule as the second logic, and changes a logic for encoding in the apparatus to be identified to the second logic, in response to determination based on the collation result that the normal code obtained by encoding with the first logic coincides with the response code; a storage control section which causes the storage section to store the second logic determined by the change section; and an identifying section which identifies a status of the apparatus to be identified based on whether the response code coincides with either of the normal codes obtained by the encoding section and with which logic the normal code coincidence with the response code has been coded.

According to another aspect of the present invention, there is provided an apparatus to be identified as described below.

An apparatus to be identified which is attachable to a predetermined identifying apparatus and causes the identifying apparatus to identify a status of the apparatus to be identified, the apparatus to be identified comprising: a response code generating section which converts an identification code output from the identifying apparatus with a set logic and supplies a response code obtained as a result of the conversion to the identifying apparatus, the response code generating section being capable of changing the logic under control of the identifying apparatus; and an output section which externally outputs the logic set in the response code generating section.

According to another aspect of the present invention, there is provided an identifying method as described below.

A method for identifying a status of an apparatus to be identified, which outputs a response code obtained by encoding a predetermined identification code with a set logic and in which a predetermined first logic is set as the logic in an initial state, by means of an identifying apparatus comprising an input port through which a signal output from the apparatus to be identified is input, an output port through which a signal is output to the apparatus to be identified and a storage section to store a second logic different from the first logic, the method comprising: outputting the identification code through the output port; converting the identification code individually with the first logic and the second logic stored in the storage section to normal codes; individually collating the normal codes with the response code input through the input port; determining a logic determined in accordance with a predetermined rule as the second logic, and changing a logic for encoding in the apparatus to be identified to the second logic, in response to determination based on a collation result that the normal code obtained by encoding with the first logic coincides with the response code; causing the storage section to store the determined second logic; and identifying a status of the apparatus to be identified based on whether the response code coincides with either of the normal codes obtained by the encoding section and with which logic the normal code coincidence with the response code has been coded.

According to another aspect of the present invention, there is provided a printing apparatus as described below.

A printing apparatus for printing an image using a consumable independent of and detachably attached to the printing apparatus, the consumable outputting a response code obtained by encoding a predetermined identification code with a set logic and a predetermined first logic being set in the consumable as the logic in an unused status, the printing apparatus comprising: an input port through which a signal output from the consumable is input; an output port through which a signal is output to the consumable; a storage section to store a second logic different from the first logic; an identification code generating section which outputs the identification code through the output port; an encoding section which converts the identification code generated by the identification code generating section individually with the first logic and the second logic stored in the storage section to normal codes; a collating section which individually collates the normal codes obtained by the encoding section with the response code input through the input port; a change section which determines a logic determined in accordance with a predetermined rule as the second logic, and changes a logic for encoding in the consumable to the second logic, in response to determination based on the collation result that the normal code obtained by encoding with the first logic coincides with the response code; a storage control section which causes the storage section to store the second logic determined by the change section; and an identifying section which identifies a status of the consumable based on whether the response code coincides with either of the normal codes obtained by the encoding section and with which logic the normal code coincidence with the response code has been coded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are diagrams showing examples of a management table stored in the information storage shown in FIG. 1.

DETAILED DESCRIPTION OF THE INVENTION

An embodiment of the present invention will be described with reference to the drawings.

Figure 1:
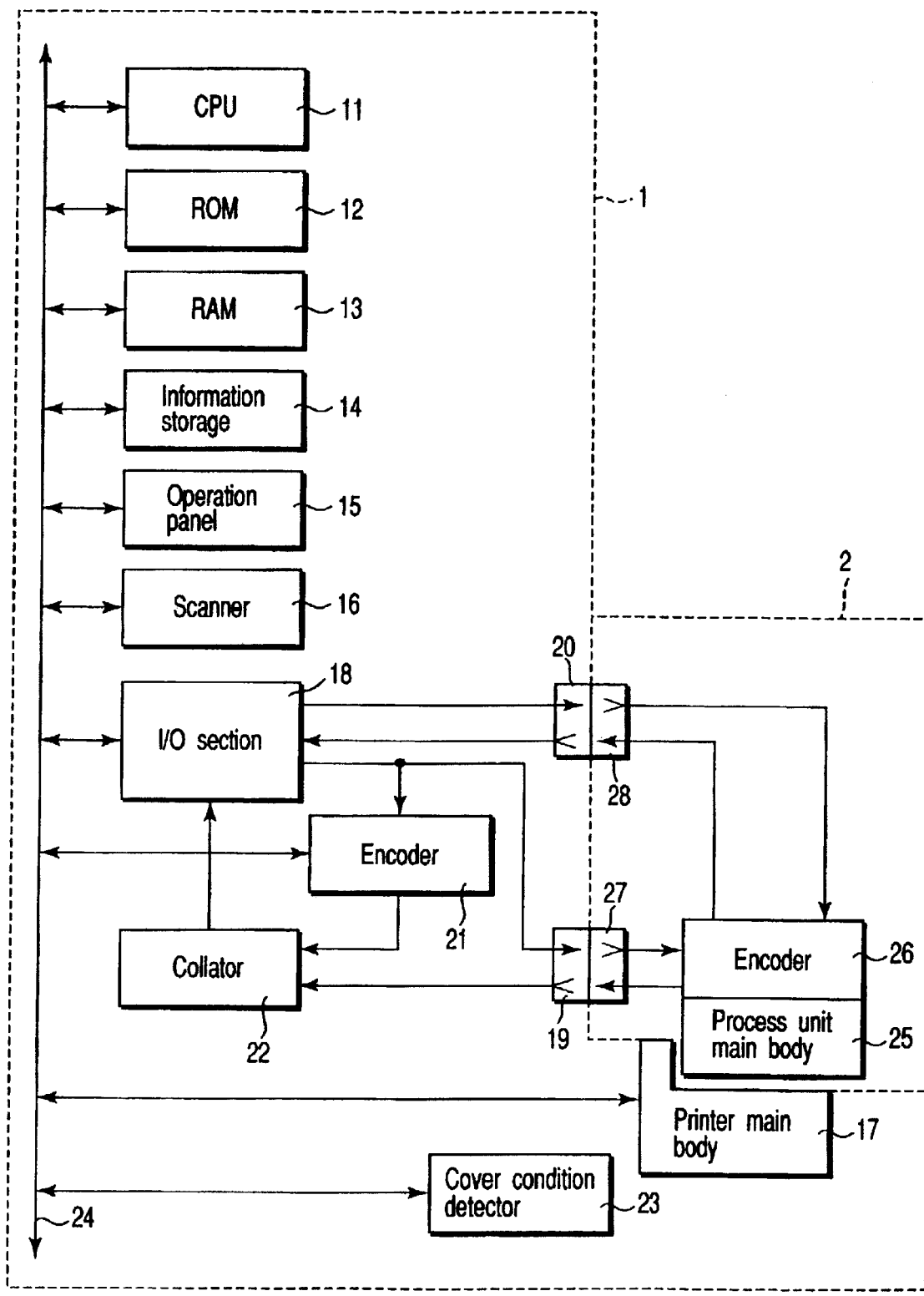
FIG. 1 is a block diagram showing a digital copying machine according to an embodiment of the present invention.

FIG. 1 is a block diagram showing a digital copying machine according to an embodiment of the present invention.

As shown in the diagram, the digital copying machine of this embodiment comprises a main unit 1 and a process unit 2. The process unit 2 is independent of the main unit 1 so that it is detachably attached to the main unit 1. The process unit 2 is formed as a cartridge to allow the user to easily exchange it.

The main unit 1 has, as shown in FIG. 1, a CPU 11, a ROM 12, a RAM 13, an information storage 14, an operation panel 15, a scanner 16, a printer main body 17, an I/O section 18, connectors 19 and 20, an encoder 21, a collator 22 and a cover condition detector 23. Of these portions, the CPU 11, the ROM 12, the RAM 13, the information storage 14, the operation panel 15, the scanner 16, the printer main body 17, the I/O section 18, the encoder 21 and the cover condition detector 23 are connected to one another via a bus 24.

The process unit 2 has, as shown in FIG. 1, a process unit main body 25, an encoder 26 and connectors 27 and 28.

The CPU 11 executes processes of controlling the respective sections to realize operations as the digital copying machine by software processing based on operation programs stored in the ROM 12.

The ROM 12 stores, for example, a control program for the CPU 11.

The RAM 13 serves as a work area used by the CPU 11 to execute various processes.

For example, a flash memory is used as the information storage 14. The information storage 14 stores various setting information or other information. Contents of these information items vary; however, it is necessary to keep them for a certain period of time.

The operation panel 15 has a key input section or a display section, which are not shown. The key input section includes, for example, a number of key switches, and receives various instructions for the CPU input by the user. The display section includes, for example, an LCD, and displays various kinds of information to be notified to the user under the control of the CPU 11.

The scanner 16 has an image sensor, an image processing circuit, etc. It reads an original to be copied and produces image data representing the original.

The printer main body 17 prints data on a paper sheet by the known electrophotographic process. When the printer main body 17 performs printing, it uses the attached process unit 2.

The connectors 19 and 20, the encoder 21 and the collator 22 are connected to the I/O section 18. The I/O section 18 performs a process of outputting a signal to the connectors 19 and 20 and the encoder 21 and a process of inputting a signal output from the collator 22.

When the process unit 2 is attached, the connector 19 and 20 are connected to the connectors 27 and 28 of the process unit 2. The connector 19 has an output port and an input port. It outputs a signal output from the I/O section 18 to the process unit 2 and supplies a signal output from the process unit 2 to the collator 22. The connector 20 has an output port and an input port. It outputs a signal output from the I/O section 18 to the process unit 2 and supplies a signal output from the process unit 2 to the I/O section 18.

A signal output from the I/O section 18 to the process unit 2 is input to the encoder 21. The encoder 21 encodes the input signal. The encoder 21 performs an arithmetic operation in accordance with a predetermined logic to realize the encoding. The logic is set by the CPU 11. More specifically, the encoder 21 performs an arithmetic operation of a predetermined logical equation including, for example, a first variable and a second variable, by substituting the input signal for the first variable and the value set by the CPU 11 for the second variable. Thus, encoding is realized. In this case, the logic is determined by the logical equation and the second variable, and the logic can be varied by arbitrarily changing the second variable.

The collator 22 collates a signal supplied from the process unit 2 through the connector 19 with a signal encoded by the encoder 21, and outputs collation result information representing whether the two signals coincide to each other.

The cover condition detector 23 detects the opening and closing of an opening/closing cover (not shown) provided in the main unit 1. It notifies the CPU 11 of the detection result in response to a request from the CPU 11. The opening/closing cover is a door to expose the storage space of the process unit 2 to the outside of the main unit 1 in order to exchange the process unit 2 or the like.

The process unit main body 25 comprises consumables, such as a photosensitive drum and a developer.

The encoder 26 is mounted in the process unit main body 25. The encoder 26 uses a PLD (Programmable Logic Device), and the internal logic can be rewritten under the control through the connector 28. The encoder 26 performs an arithmetic operation with respect to a signal input through the connector 27 in accordance with the set logic, and outputs an operation result to the connector 27. The workings of the encoder 26 to realize encoding and the method of changing the logic are the same as those of the encoder 21. When the encoder 26 receives a predetermined access, it outputs the set logic to the connector 28.

The CPU 11 executes software processing based on the operation programs stored in the ROM 12, so that it operates as an identification code generating section, an encoding control section, an identifying section, a change section, a storage control section and a usage count section as well as a known general control section in the digital copying machine.

The identification code generating section performs a process to supply a predetermined identification code for identifying the status of the process unit 2 to the connector 19 and the encoder 21 through the I/O section 18.

The encoding control section successively sets to the encoder 21 a predetermined first logic and a second logic stored in the information storage 14 in the manner as will be described later. As a result, the encoding control section controls the encoder 21 to execute encoding in the respective logics.

The identifying section identifies the status of the process unit 2 based on the collation result information output from the collator 22.

The change section executes a control process for, when the attached process unit 2 is identified as being unused, determining the second logic in accordance with a predetermined rule and changing the logic of the encoder 26, which the process unit 2 includes, to the second logic.

The storage control section updates the management table stored in the information storage 14 in order to store the second logic determined by the change section to manage it.

The usage count section counts the usage of the photosensitive drum, contained in the process unit main body 25, as a drum count value to monitor the usage of the process unit 2. The usage count section manages the drum count value in the management table in association with the second logic.

An operation of the digital copying machine constructed as described above will now be explained. The known general operations in the digital copying machine, such as a copying operation, are the same as those of the conventional digital copying machine. Therefore, the description thereof will be omitted. In the following, an operation of identifying the status of the process unit 2 attached to the main unit 1 will be described in detail.

Figure 2:
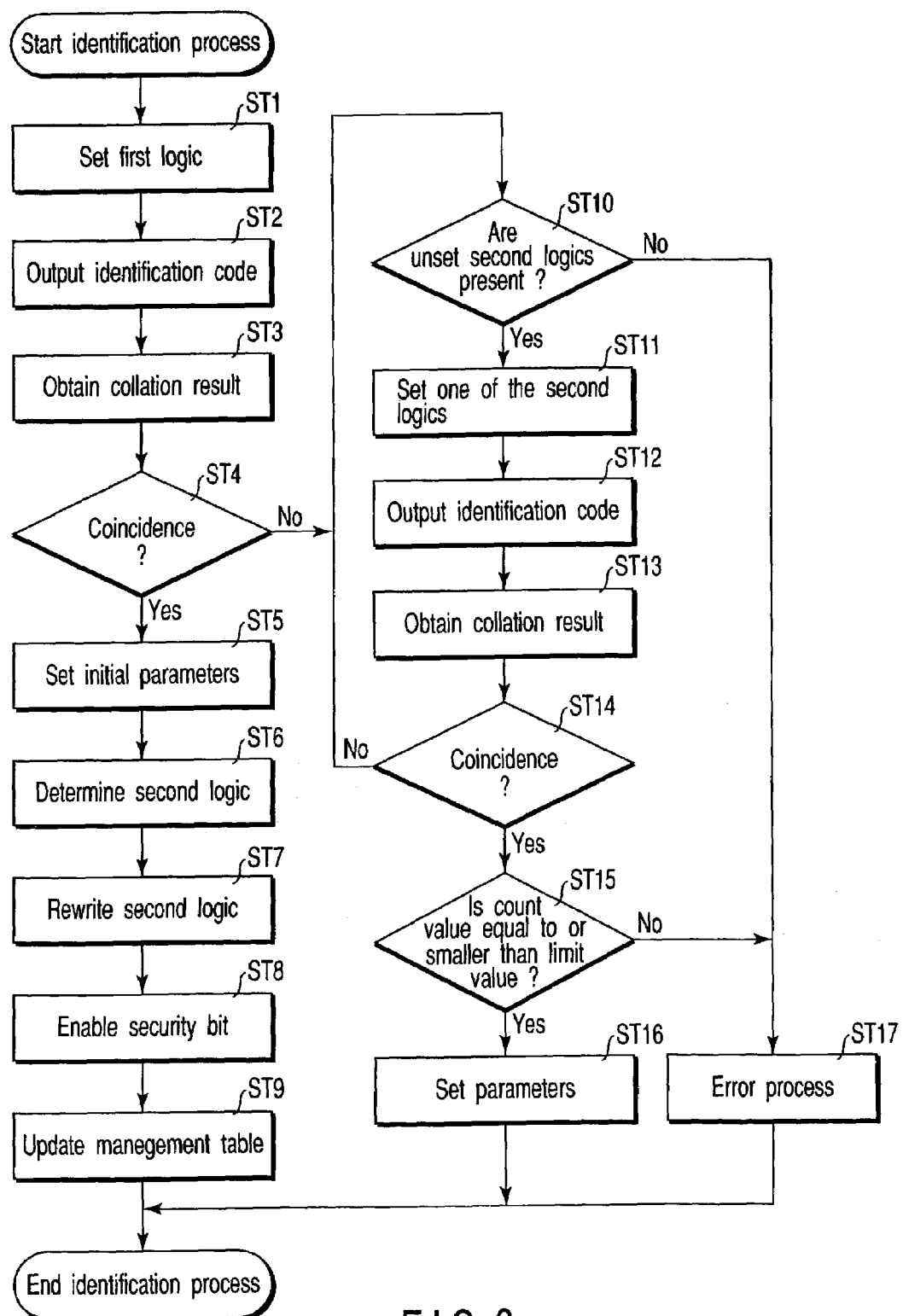
FIG. 2 is a flowchart showing an identifying process executed by the CPU shown in FIG. 1.

First, the CPU 11 executes an identification process as shown in FIG. 2 at a predetermined timing when the process unit 2 may be exchanged. The predetermined timing may be, for example, timing at which the power source of the digital copying machine is turned on and the opening/closing cover, which has been opened, is closed.

In the identification process, first, the CPU sets the logic of the encoder 21 to the first logic (step ST1). Subsequently, the CPU 11 outputs an identification code to the output port of the connector 19 through the I/O section 18 and the encoder 21 (step ST2). The identification code has a predetermined bit length and arbitrary bit arrangement. The CPU 11 generates and outputs identification codes in accordance with a predetermined rule, for example, "to combine random numbers with values of the year, month, day, hour, minute and second, and arrange them in a predetermined order". The identification codes are different from time to time.

When the identification code is output, if the process unit 2 is attached and the connector 27 is connected to the connector 19, the identification code output from the I/O section 18 is input to the encoder 26 through the connectors 19 and 27. Thus, the same identification code is given to the encoder 21 and the encoder 26. The identification code is encoded by each encoder. The code encoded by the encoder 21 (hereinafter referred to a normal code) and the code encoded by the encoder 26 (hereinafter referred to as a response code) are both input to the collator 22 and collated with each other.

Now, it is assumed that the logic of the encoder 26 of the normal process unit 2 is set to the predetermined first logic when the process unit 2 is shipped. To prevent unauthorized reading of the first logic, a security bit is enabled. Therefore, if the attached process unit 2 is a normal product and unused, the logic of the encoder 26 is set to the first logic. Hence, if the attached process unit 2 is in this status, the response code must coincide with the normal code output from the encoder 21, since it is obtained by encoding the identification code with the first logic.

Therefore, after the CPU 11 outputs the identification code in the step ST2, it obtains the result of the collation by the collator 22 (step ST3), and ascertains whether the result is determined to be coincidence or not (step ST4). If it is ascertained that the result is determined to be coincidence, the CPU 11 determines that the attached process unit 2 is a normal product and unused. Namely, the CPU 11 determines that the unused process unit 2 is attached. In this case, the CPU 11 sets initial parameters as parameters for a printing operation (step ST5). The initial parameters are parameters commensurate with a brand-new process unit 2.

Thereafter, the CPU 11 determines the second logic in accordance with a predetermined rule (step ST6). In this embodiment, since the logic is changed by changing a second variable, the CPU 11 determines a second variable here. More specifically, for example, the numerals representing the current date are arranged in the order of the month, day, hour and minute and determined to be the second variable. If it is Dec. 8, 11:58, the value "12081158" is determined to be the second variable. The CPU 11 accesses the encoder 26 through the I/O section 18 and the connectors 20 and 28, and changes the second variable used by the encoder 26 to the value determined in the step ST6, thereby rewriting the logic of the encoder 26 to the second logic (step ST7). Thus, the logic of the encoder 26 in the process unit 2, which is once used, is changed from that of the unused status. In this case, to prevent unauthorized reading of the rewritten second logic, the CPU 11 enables a security bit (step ST8).

Then, the CPU 11 updates the management table stored in the information storage 14 (step ST9). The management table is a data table, as shown in FIG. 3A, to store drum count values in association with the second logics determined as described above. In the table, the second variable is used as header information to identify the second logic. Therefore, in the step ST9, the CPU 11 updates the management table to that including the second logic newly determined in the step ST6. More specifically, if the management table as shown in FIG. 3A is used, the CPU 11 updates the management table to that as shown in FIG. 3B. Since the newly attached process unit 2 is unused, "0" is set as the drum count value. The management table as shown in FIGS. 3A and 3B is prepared so as to individually manage the second logics that are determined each time an unused process unit is attached.

When the CPU 11 completes update of the management table in the step ST9, it ends the identification process.

After that, a print operation using the attached unused process unit 2 can be performed. In the case of performing the printing operation, the CPU 11 increases the drum count value newly set to the management table in the step ST9 according to the number of printed sheets. As a result, the usage of the currently attached process unit 2 is counted. If another drum count value is already set in the management table, the drum count value is not changed. Therefore, regarding the process unit 2 that is exchanged for another process unit 2 and removed, the usage at the time when it is removed is maintained in the management table.

The logic set in the encoder 26 in the normal process unit 2, which is once used, is the second logic. Accordingly, in the identification process in the state where such a process unit 2 is attached, the response code must not coincide with the normal code, since it is obtained by encoding the identification code with the second logic.

Therefore, in this case, the CPU 11 ascertains noncoincidence in the step ST4. In this case, the CPU 11 ascertains whether second logics that have not been set to the encoder 21 are present in the second logics stored in the management table (step ST10). If it is ascertained that such second logics are present, the CPU 11 sets one of the second logics as the logic of the encoder 21 (step ST11). Subsequently, the CPU 11 outputs an identification code to the output port of the connector 19 through the I/O encoder section 18 and the encoder 21 (step ST12).

Meanwhile, the logic of the encoder 26 of the process unit 2 that was attached to the main unit 1 in the past must coincide with any one of the second logics stored in the management table. Therefore, after the CPU 11 outputs the identification code in the step ST12, it obtains the result of the collation by the collator 22 (step ST13), and ascertains whether the result is determined to be coincidence or not (step ST14). The process from the step ST10 to the step ST14 is repeated, until it is ascertained that the result is determined to be coincidence or it is ascertained in the step ST10 that there is no unset second logic. Namely, the CPU 11 ascertains whether the response code coincides with any one of the normal codes obtained by encoding with the respective second logics stored in the management table.

If it is ascertained in the step S14 that the collator 22 determines coincidence, the CPU 11 ascertains whether the drum count value, stored in the management table in association with the second logic set in the encoder 21 at that time, is equal to or smaller than a predetermined limit value (step ST15). The limit value is set in advance in consideration of the lifetime of the process unit 2. Therefore, if the drum count value does not exceed the limit value, the process unit 2 is determined to be removed from the main unit 1 before the end of the lifetime and still operable.

If it is ascertained in the step ST15 that the drum count value is equal to or smaller than the limit value, the CPU 11 sets parameters commensurate with the drum count value (step ST16), and the identification process is ended. Therefore, after that, the printing operation using the reattached process unit 2 can be performed. The usage of the process unit 2 is managed by successively increasing the drum counter value following to that at the time when it is previously removed.

In contrast, if coincidence is not ascertained in the step ST14 while the process from the step ST10 to the step ST14 is repeated, it is determined that the logic of the encoder 26 of the process unit 2 does not coincide with any of the second logics stored in the management table. In other words, the process unit 2 is neither a normal unused product nor a used product that was attached to the main unit 1 before. Even if coincidence is ascertained in the step ST14, if the drum count value exceeds the limit value, it is determined that the lifetime of the process unit has expired. Therefore, if it is ascertained that there is no unused second logic in the step ST10 or if it is ascertained that the drum count value exceeds the limit value in the step ST15, the CPU 11 determines that the attached process unit 2 is not suitable for use, and executes a predetermined error process to cope with it (step ST17). The error process is, for example, to set inhibition of execution of a printing operation, and notify the user that the unusable process unit 2 is attached. When the error process is completed, the CPU ends the identification process.

As described above, according to the present invention, the encoder 26 provided in the normal unused process unit 2 performs encoding with the first logic, and the encoded code is returned as a response code to the main unit 1. In the main unit 1, if the response code that must be returned from the process unit 2 coincides with the normal code encoded by the encoder 21 with the first logic, the process unit 2 is determined to be a normal unused process unit.

On the other hand, the encoder 26 provided in the normal process unit 2 that has been once used performs encoding with the second logic determined when it is attached, and returns the converted code as a response code to the main unit 1. In the main unit 1, if the response code that must be returned from the process unit 2 coincides with the normal code encoded by the encoder 21 with the second logic set in the process unit 2 in the past, the process unit 2 is determined to be a normal used product.

Further, in the main unit 1, if the response signal does not coincide with the normal code encoded with the first logic or the normal code encoded with the second logic, the process unit 2 is determined not to be a normal product.

Therefore, the main unit 1 can identify, based on the simple comparison between codes, the status of the process unit 2: whether a normal product or not, or whether an unused product or a used product. This identification can be realized with a very simple structure. Furthermore, since the process unit 2 converts an identification code supplied from the main unit 1 with a predetermined logic to obtain a response code, the response code is changed by changing the identification code. Therefore, no deception will be caused only by generating a predetermined response code.

Further, according to this embodiment, the second logics set in the process unit 2 are individually stored in the information storage 14, and the drum count value is counted for each of the second logics. Therefore, the usage of the process unit 2, which has already been removed, can also be managed. If the process unit 2 that has once removed is attached again, the usage of the process unit 2 is monitored by using the drum count value corresponding to the second logic set for the process unit 2. Hence, such a process unit can be used properly.

Furthermore, according to this embodiment, since the second logic is determined to include the date when the unused process unit 2 is attached, there is very little probability that the same second logic is set in another main unit 1 of the same type. For this reason, even if a process unit 2, which is removed from a first main unit 1 after used, is attached to a second main unit 1 of the same type, the second logic set for the process unit 2 is not stored in the second main unit 1 attached later. Therefore, the second main unit 1 determines that such a process unit 2 is unusable. Since the usage of such a process unit 2 cannot be managed properly by the second main unit 1, the unit is handled as being unusable as described above. Thus, it is possible to prevent improper use of the process unit 2.

Further, according to this embodiment, since a PLD is used as the encoder 26, it is feared that the set logic may be read out. However, the PLD used in this embodiment has a function to prohibit readout of the logic with a security bit. The security bit is enabled after the logic is written to prohibit readout of the logic. Therefore, an unauthorized use of the process unit 2 by illicitly rewriting the logic of the encoder 26 can be prevented.

Still further, according to this embodiment, the process unit 2, which was collected through the regular route and has been subjected to a reproduction process, can be reused as a new product by writing the first logic into the encoder 26. Thus, it can be recycled easily.

Incidentally, in the above embodiment, the identifying apparatus of the present invention is provided in the main unit 1 and the apparatus to be identified is provided in the process unit 2. Thus, an example has been described, in which the process unit 2 attached to the main unit 1 is identified. However, the subject of the identification is not limited to the process unit 2, and the present invention is applicable to identification of another unit, such as a toner unit. The unit to be subjected to the identification is also not limited to a consumable. For example, the present invention is applicable to identification of an extension unit, such as a memory unit. Further, the present invention is not limited to a digital copying machine, but is applicable to any apparatus in which two independent units are detachably attached. It can be realized also as an independent identifying apparatus or apparatus to be identified, which is used for incorporation into any apparatus.

In the above embodiment, the identification code is changed in succession. However, a single identification code may be used.

In the above embodiment, the second variable is changed, thereby to change the second logic. However, the second logic may be directly changed.

The rule to determine the second variable is not limited to that of the above embodiment, but may be any rule. For example, if a random number is combined, the probability of the same second logic being determined in another apparatus of the same type is much lowered. Moreover, if a unique numeral, such as the serial number of the main unit 1, is combined, there is no probability of the same second logic being determined in another apparatus of the same type.

Further, in the above embodiment, the usage of the process unit 2 is managed by the counter of the number of printed sheets. However, the usage of the process unit 2 may be monitored on the basis of another factor, such as the total number of revolutions of the photosensitive drum or the usage of toner.

Furthermore, in the above embodiment, the encoder 21 and the collator 22 are constructed from hardware circuits. However, the process executed by these circuits may be realized by the CPU 11 through a software process.

Additional advantages and modifications will readily occur to those skilled in the art. Therefore, the invention in its broader aspects is not limited to the specific details and representative embodiments shown and described herein. Accordingly, various modifications may be made without-departing from the spirit or scope of the general inventive concept as defined by the appended claims and their equivalents.

What is claimed is:

1. A printing apparatus for printing an image using a consumable detachably attached to the printing apparatus, wherein the consumable is adapted to output a response code obtained by encoding an identification code with a set logic and wherein a first logic is set in the consumable as the set logic when the consumable is unused, said printing apparatus comprising:

a generating section which generates the identification code;

an output port which outputs the identification code to the consumable;

an input port through which the response code from the consumable is input;

an encoding section which encodes the identification code using the first logic to obtain a first normal code;

a collating section which collates the first normal code with the response code input through the input port;

a change section which changes the set logic in the consumable to a second logic, which is different from the first logic and which is determined in accordance with a predetermined rule, when the response code coincides with the first normal code;

a storage section which stores a plurality of said second logics and a plurality of count values which are associated with the second logics, respectively;

a storage control section which controls the storage section;

an updating section which updates, in accordance with use of the consumable, the count value stored in the storage section in association with the second logic corresponding to the consumable;

a determining section which determines whether each count value is equal to or less than a limit value; and an identifying section which identifies whether the consumable is usable;

wherein if the response code coincides with the first normal code, the change section changes the set logic to the second logic determined in accordance with a predetermined rule, and the storage control section causes the storage section to store the determined second logic and an initial value as a count value, and the identifying section identifies the consumable as usable;

wherein if the response code does not coincide with the first normal code, the encoding section encodes the identification code using each of the second logics stored in the storage section to obtain second normal codes, and the collating section collates the second normal codes with the response code;

wherein if the response code coincides with any one of the second normal codes, the determining section determines whether the count value associated with the second logic used by the encoding section to obtain the coinciding second normal code is equal to or less than the limit value, and the identifying section identifies the consumable as usable if the count value is equal to or less than the limit value, and identifies the consumable as unusable if the count value is larger than the limit value;

wherein if the response code does not coincide with the first normal code and does not coincide with any said second normal code, the identifying section identifies the consumable as unusable.

2. The printing apparatus according to claim 1, further comprising a parameter setting section which sets a parameter commensurate with the count value corresponding to the consumable, when the count value is equal to or less than the limit value.

3. A method for controlling a printing apparatus for printing an image using a consumable detachably attached to the printing apparatus, wherein the consumable is adapted to output a response code obtained by encoding an identification code with a set logic and wherein a first logic is set in the consumable as the set logic when the consumable is unused, said method comprising:

generating the identification code;

outputting the identification code to the consumable;

receiving the response code from the consumable;

encoding the identification code using the first logic to obtain a first normal code;

collating the first normal code with the received response code;

if the response code coincides with the first normal code:

changing the set logic in the consumable to a second logic, which is different from the first logic and which is determined in accordance with a predetermined rule;

storing the determined second logic in a storage section with stores a plurality of said second logics, each in association with a corresponding count value, such that the determined second logic is stored in association with a count value that is an initial value;

identifying the consumable as usable; and updating, in accordance with use of the consumable, the count value stored in the storage section in association with the determined second logic corresponding to the consumable; and if the response code does not coincide with the first normal code:

encoding the identification code using one of the plurality of second logics stored in the storage section to obtain a second normal codes, and collating the second normal code with the response code;

repeating said encoding using a different one of the stored second logics until one of: (i) one of the second codes coincides with the response code, and (ii) it is determined that none of the second codes coincide with the response code;

when one of the second codes coincides with the response code, determining whether the count value associated with said one of the second codes is equal to or less than a limit value, and identifying the consumable as (i) usable if the count value is equal to or less than the limit value, and (ii) unusable if the count value is larger than the limit value; and when none of the second codes coincide with the response code, determining the consumable as unusable.

4. The method according to claim 3, further comprising setting a parameter commensurate with the count value corresponding to the consumable, when the count value is equal to or smaller than the limit value.

* * * * *